(12) United States Patent
Nejatali et al.

(10) Patent No.: US 9,973,031 B2
(45) Date of Patent: May 15, 2018

(54) ORIENTATION-INDEPENDENT WIRELESS CHARGING

(71) Applicant: Aerngy, Inc., Trabuco Canyon, CA (US)

(72) Inventors: Saeed Nejatali, Trabuco Canyon, CA (US); Mohammad Javad Afshar, Trabuco Canyon, CA (US)

(73) Assignee: AERNGY, INC., Trabuco Canyon, CA (US)

(*) Notice: Subject to any disclaimer, the term of this patent is extended or adjusted under 35 U.S.C. 154(b) by 0 days. days.

(21) Appl. No.: 15/400,884

(22) Filed: Jan. 6, 2017

(65) Prior Publication Data

US 2017/0201118 A1    Jul. 13, 2017

Related U.S. Application Data

(60) Provisional application No. 62/275,911, filed on Jan. 7, 2016.

(51) Int. Cl.
 *H01M 10/44*  (2006.01)
 *H02J 7/02*   (2016.01)

(52) U.S. Cl.
 CPC .................................... *H02J 7/025* (2013.01)

(58) Field of Classification Search
 CPC ............. H02J 7/355; H02J 7/025; H02J 5/005
 USPC ................................... 320/107, 108; 307/104
 See application file for complete search history.

(56) References Cited

U.S. PATENT DOCUMENTS

| | | | |
|---|---|---|---|
| 6,331,744 B1 * | 12/2001 | Chen | A47J 36/26 310/171 |
| 9,059,598 B2 | 6/2015 | Kang et al. | |
| 9,124,114 B2 | 9/2015 | Haruyama | |
| 2003/0030342 A1 * | 2/2003 | Chen | A47J 36/26 310/102 R |
| 2011/0084752 A1 * | 4/2011 | Julstrom | H02J 7/025 327/336 |
| 2011/0304220 A1 * | 12/2011 | Whitehead | H01F 21/08 307/104 |
| 2012/0169139 A1 * | 7/2012 | Kudo | H02J 5/005 307/104 |
| 2015/0008736 A1 | 1/2015 | Uchida et al. | |
| 2015/0054344 A1 * | 2/2015 | Ng | H02J 5/005 307/104 |

* cited by examiner

*Primary Examiner* — Edward Tso
(74) *Attorney, Agent, or Firm* — Wilson Sonsini Goodrich & Rosati (57) ABSTRACT

Methods are provided herein for orientation-independent, wireless charging of devices. The methods disclosed herein comprise transmitters and at least one receiver to transmit power wirelessly. The methods described herein comprise generating rotating magnetic fields to induce an electric current in a device.

20 Claims, 7 Drawing Sheets

ORIENTATION-INDEPENDENT WIRELESS CHARGING

CROSS-REFERENCE

This application claims the benefit of U.S. Provisional Application No. 62/275,911, filed Jan. 7, 2016, which application is incorporated herein by reference.

BACKGROUND

The vast majority of electronic devices comprises rechargeable batteries and requires frequent charging. Some of these devices consume a small amount of power and are amenable to wireless charging. For example, medical implanted devices and Internet of Things (IoT) devices have power requirements ranging between μW and mW and may be charged wirelessly.

SUMMARY

Described herein are methods for transmitting power wirelessly to one or more devices. In some embodiments of the methods described herein, the methods comprise transmitters, at least one receiver, and a power source, to control the frequency, phase, and amplitude of the transmitted energy. The methods described herein are capable of transmitting power wirelessly and independently of the orientation and position of the receiver(s) within a three-dimensional charging space.

In some embodiments of the methods described herein, the methods create a rotating magnetic field for transferring power wirelessly to one or more devices.

The methods described herein improve upon traditional power transfer methods in a number of ways:

Ease of Use

One example of how the methods described herein improve on traditional methods for power transfer is by enabling wireless power transfer within a large charging space.

Most power transfer methods require a transmitter to physically connect with a receiver in order to transmit power between devices. Other current power transfer methods offer a "wireless" power transfer that comprises a charging pad, avoiding the need to physically connect the transmitter and the receiver to each other by instead placing the device to be charged on the charging pad. However, little, if any, spatial freedom is offered in these "wireless" systems. Placing a receiver on a charging pad with a small placement freedom is barely superior to a universal charging station. A major enhancement in user experience is achieved by the present disclosure by allowing the user to have total freedom of movement and placement of the device to be charged within a large charging space (e.g. a charging space as large as a standard size room).

Wireless Charging is Independent of Orientation

Another example of how the methods described herein improve on traditional methods for power transfer is by enabling wireless power transfer that is independent of the orientation or position of the device to be charged.

The methods described herein do not require the device to be charged to be in a specific orientation or position as compared to current wireless power transfer methods. This advantage is particularly important when transferring power to implanted medical devices, for example, where the user has no control over the orientation of the receiver implanted within his or her body. Current wireless power transfer methods depend on the orientation and the position of the receiver, which in the case of implanted medical devices, makes the wireless power transfer difficult to achieve.

Described herein, is a method for orientation-independent, wireless charging of a device comprising: generating a rotating magnetic field, within a three-dimensional charging space, by using a first transmitter configured to transmit a first signal having a first frequency and a first amplitude, a second transmitter configured to transmit a second signal having a second frequency and a second amplitude, and a third transmitter configured to transmit a third signal having a third frequency and a third amplitude; and wherein the first frequency, the second frequency, and the third frequency are equal, and wherein the first amplitude, the second amplitude, and the third amplitude vary at the same frequency; and wherein the first frequency has a phase difference of 90 degrees with respect to the second frequency and the third frequency; and wherein the third amplitude has a phase difference of 90 degrees with respect to the first amplitude and the second amplitude; and inducing, by the rotating magnetic field, an electric current in at least one receiver within the three-dimensional charging space; wherein the electric current that is induced in the receiver provides power wirelessly to the device, independent of the orientation of the device, relative to the rotating magnetic field. In some embodiments, the transmitters comprise a transmit antenna or a transmit coil, an oscillator, a driver, and a transmitter impedance match circuit. In some embodiments, the oscillator transforms a direct current into an alternating current (AC). In some embodiments, the driver amplifies the alternating current and transfers it to the transmitter impedance match circuit. In some embodiments, the transmitter impedance match circuit matches the impedance of an electric current amplified by the driver to the impedance of the transmit antenna or the transmit coil. In some embodiments, the transmitters are always on. In some embodiments, the receiver comprises a receive antenna or receive coil, a receiver impedance match circuit, and a voltage regulator. In some embodiments, the receiver impedance match circuit cancels out the reactive impedance of a signal generated by the receive antenna or receive coil. In some embodiments, the voltage regulator regulates an electric current induced in the receiver and provides said regulated electric current to the device. In some embodiments, the device comprises the receiver. In some embodiments, the three-dimensional charging space ranges between 0.01 m$^3$ and 100 m$^3$. In some embodiments, the transmitters are installed on all three axes of space of the three-dimensional charging space. In some embodiments, the frequency of the transmitters placed on a same axis of space is kept at a phase difference of 0 degrees. In some embodiments, the frequency at which the amplitude varies is less than the first frequency, the second frequency, and the third frequency. In some embodiments, a cycle of the rotating magnetic field is independent of the first frequency, the second frequency, or the third frequency. In some embodiments, the amount of the electric current transferred is independent of the orientation of the transmitters. In some embodiments, the amount of the electric current transferred is independent of the orientation of the receivers. In some embodiments, the phase differences in amplitude and frequency depend on a physical position of the transmitters in the charging space. In some embodiments, the rotating magnetic field induces an electric current in the receive antenna or receive coil. In some embodiments, the transmitters are energized by a synchronized electric power source.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

BRIEF DESCRIPTION OF THE DRAWINGS

The novel features of the subject matter disclosed herein are set forth with particularity in the appended claims. A better understanding of the features and advantages of the subject matter disclosed herein will be obtained by reference to the following detailed description that sets forth illustrative embodiments, in which the principles of the subject matter disclosed herein are utilized, and the accompanying drawings of which:

DETAILED DESCRIPTION

Described herein are methods for the orientation-independent, wireless charging of a device.

The term "user" is used herein to refer to a human that may use the wireless power transfer methods disclosed herein.

The terms "charge" or "charging" and "power transfer" or "transferring of power" are used interchangeably herein to refer to the transferring of electric power to an electronic device.

The terms "electric current" or "current," "power" or "electric power," and "energy" are used interchangeably herein to refer to energy in the form of an electric current that provides power to a device.

The terms "x-axis," "y-axis," and "z-axis" refer to all three dimensions of space within a charging space.

The terms "phase difference," "phase shift," or "φ" are used interchangeably herein to refer to the difference, expressed in degrees, between two or more signals or waves referenced to the same point in time.

Described herein, is a method for orientation-independent, wireless charging of a device comprising: generating a rotating magnetic field, within a three-dimensional charging space, by using a first transmitter configured to transmit a first signal having a first frequency and a first amplitude, a second transmitter configured to transmit a second signal having a second frequency and a second amplitude, and a third transmitter configured to transmit a third signal having a third frequency and a third amplitude; and wherein the first frequency, the second frequency, and the third frequency are equal, and wherein the first amplitude, the second amplitude, and the third amplitude vary at the same frequency; and wherein the first frequency has a phase difference of 90 degrees with respect to the second frequency and the third frequency; and wherein the third amplitude has a phase difference of 90 degrees with respect to the first amplitude and the second amplitude; and inducing, by the rotating magnetic field, an electric current in at least one receiver within the three-dimensional charging space; wherein the electric current that is induced in the receiver provides power wirelessly to the device, independent of the orientation of the device, relative to the rotating magnetic field.

In some embodiments, the first signal, the second signal, and the third signal transmitted by the first transmitter, the second transmitter, and the third transmitter, respectively are electric currents. In some embodiments, the first signal, the second signal, and the third signal transmitted by the first transmitter, the second transmitter, and the third transmitter, respectively are voltages. In some embodiments, the first signal, the second signal, and the third signal transmitted by the first transmitter, the second transmitter, and the third transmitter, respectively are magnetic fields. In some embodiments, the first signal, the second signal, and the third signal transmitted by the first transmitter, the second transmitter, and the third transmitter, respectively are electrical signals. In some embodiments, the first signal, the second signal, and the third signal transmitted by the first transmitter, the second transmitter, and the third transmitter, respectively are electromagnetic signals.

Electromagnetic induction is mathematically described by the Maxwell-Faraday equation:

$$\nabla \times E = -\frac{\partial B}{\partial t};$$

where $\nabla \times$ is the curl operator, $E(r, t)$ is the electric field, and $B(r, t)$ is the magnetic field; both electric and magnetic fields are functions of a position $r$ and a time $t$. The Maxwell-Faraday equation states that a time-varying magnetic field will always accompany a spatially-varying, non-conservative electric field, and vice versa. Furthermore, Faraday's Law of Induction states that a voltage is induced in a circuit whenever relative motion exists between a conductor and a magnetic field and that the magnitude of this voltage is proportional to the rate of change of the flux.

Figure 1:
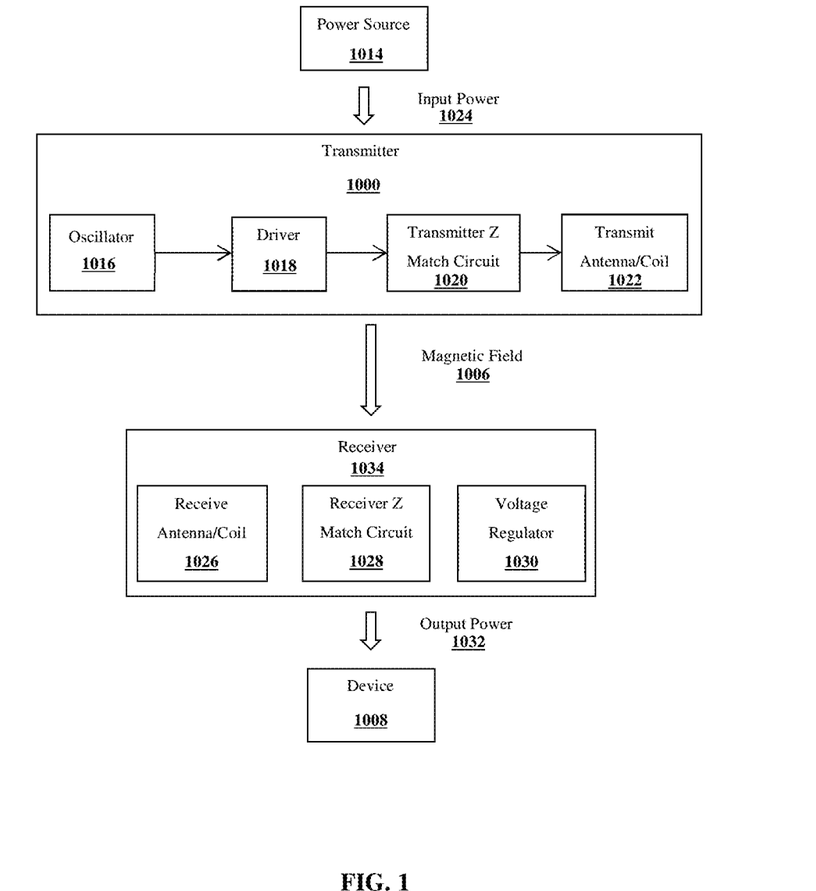
FIG. 1 shows an exemplary flow chart illustrating the wireless power transfer.

FIG. 1 shows an exemplary flow chart illustrating the wireless power transfer from an electric power source 1014 providing input power 1024 to an electronic device 1008 using magnetic inductive coupling. An electric power source 1014 provides a direct electric current (DC) 1024 to the transmitters 1000. A magnetic field 1006 is generated by the electric current flowing through a transmit antenna or coil 1022 within the transmitters 1000. Furthermore, the frequency, phase, and amplitude of the magnetic field 1006 are modulated to generate a rotating magnetic field 1006 within a three-dimensional charging space. The resulting rotating magnetic field 1006 induces an electric current in one or more receivers 1034 that are placed within the three-dimensional charging space; thereby, a device 1008 comprising a receiver 1034 is charged wirelessly.

In some embodiments, the transmitters 1000 comprise four electrical components: an oscillator 1016, a driver 1018, a transmitter impedance (Z) match circuit 1020, and a transmit antenna or coil 1022, as shown in FIG. 1. In some embodiments, the oscillator 1016 converts the direct current (DC) 1024 provided by the electric power source 1014 into an alternating current (AC), and generates a signal or a wave comprising an amplitude and a frequency. In some embodiments, the user modulates the frequency by controlling the oscillator 1016 settings. In some embodiments, the user modulates a phase difference or phase shift between two or more signals by controlling the oscillator 1016 settings. The signal generated by the oscillator 1016 is generally weak and requires amplification.

As shown in FIG. 1, the transmitter comprises a driver 1018. In some embodiments, the driver 1018 amplifies the signal or waves that are generated by the oscillator 1016. In some embodiments, the driver 1018 increases the power of the signal or waves that are generated by the oscillator 1016. The user modulates the amplitude of the signal or waves generated by the oscillator 1016 by controlling the amplitude settings of the driver 1018. In some embodiments, the driver 1018 is a class D or class F radio frequency (RF) power amplifier.

As shown in FIG. 1, the transmitter 1000 comprises a transmitter impedance (Z) match circuit 1020. The transmitter impedance (Z) match circuit 1020 matches the impedances of the signal of the driver 1018 with the impedance of the transmit antenna or coil 1022. In some embodiments, matching impedances maximizes power transfer. In some embodiments, matching impedances minimizes signal reflection.

As shown in FIG. 1, the transmitter 1000 comprises a transmit antenna or a coil 1022 that is an electrical conductor. In some embodiments, transmit antennae or transmit coils 1022 are non-limiting examples of magnetic energy transfer components and may be replaced with any other suitable means of energy transfer components. In some embodiments, the transmit antenna or coil 1022 comprises at least one wire in the shape of a coil, a helix, or a spiral. In some embodiments, the transmit antenna or coil 1022 comprises at least one wire in the shape of a coil, a helix, or a spiral. In some embodiments, the wire is insulated with non-conductive insulation. In some embodiments, the wire is insulated with plastic or enamel. In some embodiments, the wire comprises more than one winding. In some embodiments, the transmitters 1000 comprise a transmit antenna or a coil 1022 further comprising at least one solenoid, Helmholtz coil, Maxwell coil, or a Halbach's array. In some embodiments, the transmitters 1000 comprise a transmit antenna or a coil 1022 that is a coil having a magnetic core material such as, but not limited to annealed iron, laminated silicon steel, silicon-iron alloy, silicon-steel alloy, nickel-iron alloy, nickel-iron-molybdenum alloy, iron, copper, carbonyl iron, hydrogen-reduced iron, iron-boron-silicon alloy, or ferrite ceramics.

FIG. 1 also shows the transmitter 1000 wirelessly transmits power to at least one receiver 1034 via a magnetic field 1006. The receiver 1034 wirelessly provides the power to a device 1008. In some embodiments, the receiver 1034 wirelessly provides power to a battery within a device 1008. In some embodiments, the receiver 1034 wirelessly provides power to a device 1008 not powered by a battery. In some embodiments, the receiver 1034 wirelessly provides power to a wired device 1008. In some embodiments, the receiver 1034 wirelessly provides power to a device 1008 that receives power via a physical connection to a power source. In some embodiments, the device 1008 is an electronic device.

The device 1008 charging wirelessly and in an orientation-independent manner comprises at least one receiver 1034. In some embodiments, the receiver 1034 comprises three components: a receive antenna or coil 1026, a receiver impedance (Z) match circuit 1028, and a voltage regulator 1030. The rotating magnetic field 1006 generated by the transmitters 1000 induces a current in the receive antenna or coil 1026, wherein the receive antenna or coil 1026 is an electrical conductor.

In some embodiments, receive antennae or transmit coils 1026 are non-limiting examples of magnetic energy transfer components and may be replaced with any other suitable means of energy transfer components. In some embodiments, the receive antenna or coil 1026 comprises at least one wire in the shape of a coil, a helix, or a spiral. In some embodiments, the receive antenna or coil 1026 comprises at least one wire in the shape of a coil, a helix, or a spiral. In some embodiments, the wire is insulated with non-conductive insulation. In some embodiments, the wire is insulated with plastic or enamel. In some embodiments, the wire comprises more than one winding. In some embodiments, the receiver 1034 comprise a receive antenna or coil 1026 further comprising at least one solenoid, Helmholtz coil, Maxwell coil, or Halbach's array. In some embodiments, the receive antenna or coil 1026 is a coil having a magnetic core material such as, but not limited to annealed iron, laminated silicon steel, silicon-iron alloy, silicon-steel alloy, nickel-iron alloy, nickel-iron-molybdenum alloy, iron, copper, carbonyl iron, hydrogen-reduced iron, iron-boron-silicon alloy, or ferrite ceramics.

The receiver 1034 comprises a receiver impedance (Z) match circuit 1028. The receiver impedance (Z) match circuit 1028 cancels out the reactive impedance of a signal generated by the receive antenna or receive coil 1026. The reactive impedance is commonly referred to as reactance and forms the imaginary part of complex impedance, while resistance forms the real part of complex impedance. In some embodiments, the receiver impedance (Z) match circuit 1028 removes the imaginary component of the impedance of the signal generated by the receive antenna or coil 1026. In some embodiments, canceling out the reactive impedance of the signal generated by the receive antenna or coil 1026 maximizes power transfer. In some embodiments, canceling out the reactive impedance of the signal generated by the receive antenna or coil 1026 minimizes signal reflection.

As shown in FIG. 1, the receiver comprises a voltage regulator 1030. In some embodiments, the voltage regulator 1030 regulates an electric current induced in the receiver 1034 and provides said regulated electric current to the device 1008. In some embodiments, the voltage regulator 1030 provides the output power 1032 to the device 1008. The voltage regulator 1030 maintains a constant voltage and provides an electrified voltage to the device 1008. In some embodiments, the voltage regulator 1030 is a coil-rotation AC voltage regulator. In some embodiments, the voltage regulator 1030 is an electromechanical regulator. In some embodiments, the voltage regulator 1030 is a pulse width modulated (PWM) AC voltage regulator. In some embodiments, the voltage regulator 1030 is a ferroresonant transformer. In some embodiments, the voltage regulator 1030 is a linear series regulator. In some embodiments, the voltage regulator 1030 is a switching regulator. In some embodiments, the voltage regulator 1030 is a silicon controlled rectifier regulator.

In some embodiments, the magnetic fields 1006 generated by the transmitters 1000 induce an electric current in the receiver or receivers 1034. In some embodiments, the current induced in the receiver 1034 provides power wirelessly to the device 1008. In some embodiments, the current induced in the receiver 1034 provides power wirelessly to the device's 1008 battery. In some embodiments, the electric current is induced in the receiver 1034 through an air gap or through solid objects within a given charging space. In some embodiments, the electric current induced in the receiver 1034 provides power wirelessly through an air gap or through solid objects within a given charging space. In some embodiments, the phase, frequency, and amplitude of the signals transmitted by the transmitters 1000 are modulated to enhance the amount of power transferred wirelessly to a receiver 1034. In some embodiments, the phase, frequency, and amplitude of the signals transmitted by the transmitters 1000 are modulated to enhance the efficiency of power transferred wirelessly to a receiver 1034. In some embodiments, the phase, frequency, and amplitude of the signals transmitted by the transmitters 1000 are modulated to increase a charging space in which power is transferred wirelessly to a receiver 1034.

Figure 2:
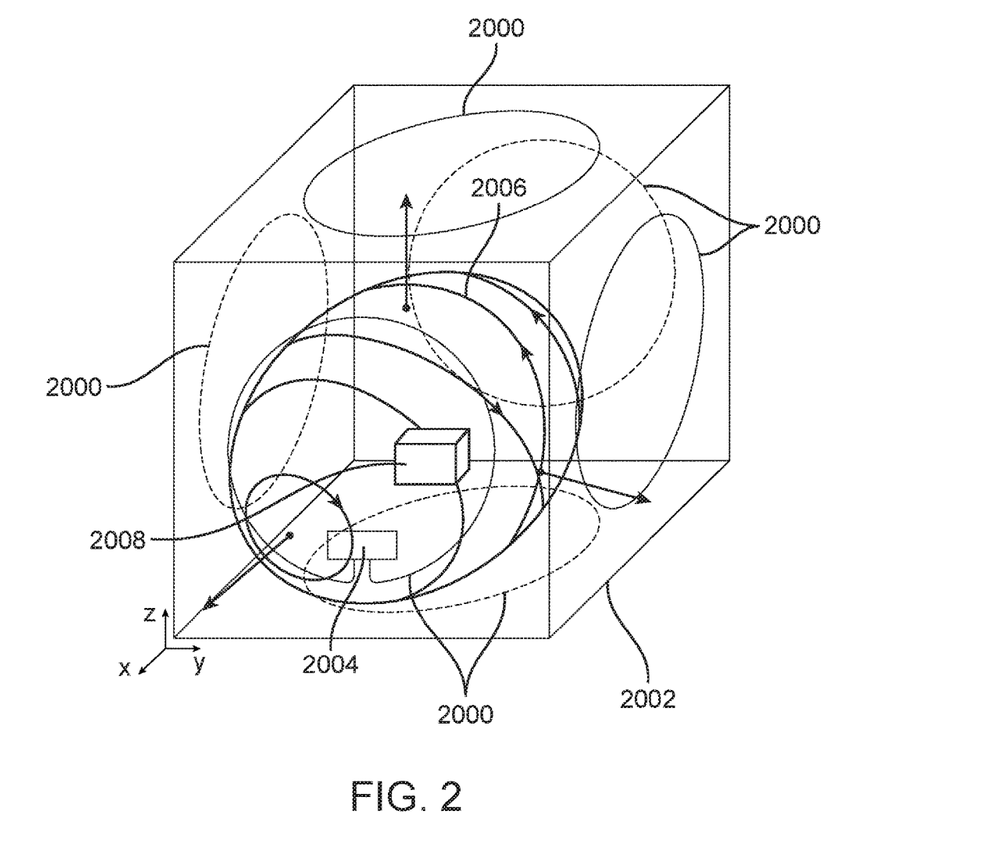
FIG. 2 shows an illustration of an exemplary embodiment of long distance charging wherein six transmitters 2000 are placed within three axes of a charging space 2002.

FIG. 2 shows an illustration of an exemplary embodiment of long distance wireless charging of a device 2008 using magnetic inductive coupling, wherein six transmitters 2000 are placed within three axes of a three-dimensional charging space 2002.

In some embodiments, the transmitters 2000 are kept energized all the time. In some embodiments, the transmitters and receivers do not communicate. In some embodiments, the transmitters are turned on only when a receiver is in the charging space and requests power transfer. In some embodiments, the transmitters and receivers communicate with each other using in-band or out-of-band communication methods. In some embodiments, the receivers request wireless power transfer from the transmitters via an in-band or out-of-band communication methods.

The electrical components 2004 of the transmitters comprise four components: an oscillator 1016, a driver 1018, a transmitter impedance (Z) match circuit 1020, and a transmit antenna or coil 1022, as shown in FIG. 1. The amplified alternating current generated by the oscillator 1016 and the driver 1018 energizes each transmit antenna or coil 1022, which consequently generates a magnetic field 2006. In some embodiments, the amplified alternating currents energizing each transmitter 2000 are synchronized. In some embodiments, the amplified alternating currents energizing each transmitter 2000 have the same frequency. In some embodiments, the amplified alternating currents energizing each transmitter 2000 have different frequencies. In some embodiments, the amplified alternating currents energizing each transmitter 2000 have frequencies with a phase difference. In some embodiments, the amplified alternating currents energizing each transmitter 2000 have the same amplitude. In some embodiments, the amplified alternating currents energizing each transmitter 2000 have different amplitudes. In some embodiments, the amplified alternating currents energizing each transmitter 2000 have amplitudes with a phase difference.

In some embodiments, the transmitters 2000 that are placed on a same axis of space, as shown in FIG. 2, are kept at a phase difference of 0 degrees. In some embodiments, all of the transmitters 2000 placed on an x-axis have a phase difference of 0 degrees. In some embodiments, all of the transmitters 2000 placed on a y-axis have a phase difference of 0 degrees. In some embodiments, all of the transmitters 2000 placed on a z-axis have a phase difference of 0 degrees. In some embodiments, each transmitter 2000 generates its own magnetic field 2006. In some embodiments, the vector sum of all magnetic fields generated by the transmitters induces a current in the receiver and enables wireless charging. In some embodiments, the transmitters 2000 are not perpendicular to each other.

The phase differences of the electric power source energizing the transmitters 2000 are controlled to achieve a desired magnetic field vector sum. As shown in FIG. 2, the transmitters 2000 have a phase difference of 90 degrees with respect to the other transmitters. In some embodiments, the phase difference depends on the placement of the transmitters 2000 within a charging space 2002 and the angle between them.

FIG. 2 shows the rotating magnetic field 2006 generated by the transmitters 2000. Theoretically, if one were to place the origin of the magnetic field vector sum at the center of the charging space 2002, the shape of the magnetic field 2006 would be an ellipsoid. In some embodiments, the shape of the magnetic field 2006 depends on the placement of the transmitters 2000. In some embodiments, the shape of the magnetic field 2006 depends on the size of the charging space 2002. In some embodiments, the shape of the magnetic field 2006 depends on the shape of the charging space 2002. In some embodiments, the phase differences of each transmitter 2000 are controlled such that the magnetic field vector sum rotates in the shape of an ellipsoid in each cycle. In some embodiments, the magnitude of the magnetic field 2006 generated by each transmitter 2000 is calibrated such that the ellipsoid shape in which the magnetic field vector sum rotates is reduced to a sphere.

In some embodiments, the synchronization between transmitters 2000 is achieved by one of them acting as a master and the others as slaves. In some embodiments, the synchronization is phase synchronization. In some embodiments, the synchronization is frequency synchronization. In some embodiments, the phase synchronization is achieved by transmitters 2000 being connected to each other either wired or wirelessly. In some embodiments, the frequency synchronization is achieved by transmitters 2000 being connected to each other either wired or wirelessly.

In some embodiments, the transmitters 2000 are only placed on the x- and y-axes. One of the transmitters 2000 that is placed on an x-axis is the master and the phase difference of the transmitters 2000 placed on a y-axis is kept at 90 degrees with respect to the master. This arrangement creates a rotating magnetic field 2006 in an x-y plane following an ellipse pattern, as shown in FIG. 2. In some embodiments, only one transmitter 2000 is placed on each one of the x- and y-axes. In some embodiments, at least one transmitter 2000 is placed on each one of the x- and y-axes.

Figure 3:
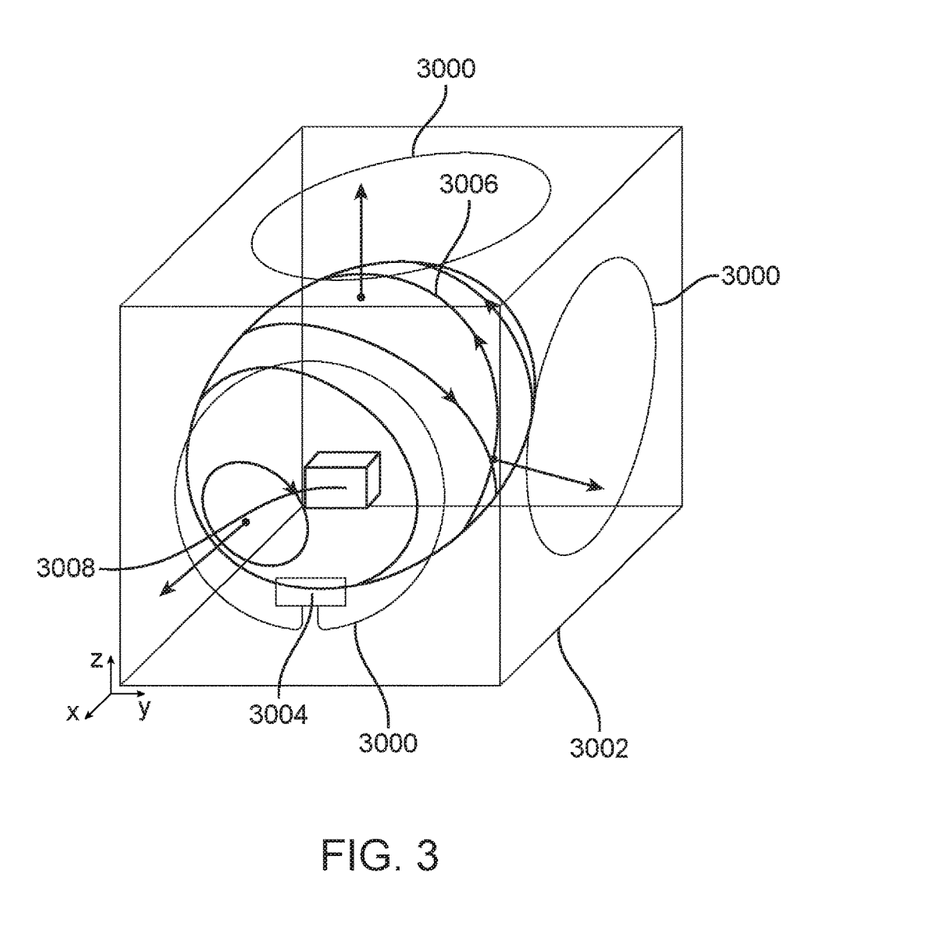
FIG. 3 shows an illustration of an exemplary embodiment of long distance charging wherein three transmitters 3000 are placed within three axes of a charging space 3002.

FIG. 3 shows an illustration of yet another exemplary embodiment of long distance charging wherein three transmitters 3000 are placed within three axes of a charging space 3002. In this embodiment, only one transmitter 3000 is placed in each x-, y-, and z-axes. In some embodiments, a first transmitter 3000 is configured to transmit a first signal having a first frequency and a first amplitude, a second transmitter 3000 is configured to transmit a second signal having a second frequency and a second amplitude, and a third transmitter 3000 is configured to transmit a third signal having a third frequency and a third amplitude. In some embodiments, the frequency at which the amplitude varies is less than the first frequency, the second frequency, and the third frequency. In some embodiments, the first frequency, the second frequency, and the third frequency are carrier frequencies.

The methods described herein comprise at least three transmitters 3000, wherein all of the transmitters 3000 transmit a signal having a carrier frequency f1 and an amplitude varying at a frequency f2. The first and second transmitters transmit a first and second signals that have a phase difference of 90 degrees with respect to each other. In addition, the third transmitter 3000 transmits a third signal that has an amplitude with a phase difference of 90 degrees with respect to the first and second signals.

The waveforms associated with the phase difference of 90 degrees of the first and second signals are mathematically described by the formulas below:

$$H_X = A_X \sin(2\pi f1 t);$$

$$H_Y = A_Y \sin(2\pi f1 t + \pi/2)$$

In all of the mathematical formulas presented in this application: $H_X$, $H_Y$, and $H_Z$ represent the magnetic field 3006 generated by the transmitters placed on the x-, y-, and z-axes, respectively; f1 represents the main carrier frequency of the wireless power system; f2 represents the frequency at which the magnetic field 3006 varies, and $\varphi$ is an arbitrary phase difference. The arbitrary phase difference value, $\varphi$, is irrelevant in generating the rotating magnetic field.

Furthermore, in the same exemplary embodiment, the magnitude or amplitude of the signal or magnetic field 3006 generated by the transmitters 3000 placed on the x- and y-axes is set to vary with a frequency f2. The waveforms associated with said f1 and f2 frequencies and describing the magnitude or amplitude of the magnetic field 2006 are mathematically described by the formulas below:

$$H_X = A_X \sin(2\pi f1 t) \sin(2\pi f2 t)$$

$$H_Y = A_Y \sin(2\pi f1 t + \pi/2) \sin(2\pi f2 t)$$

Lastly, in the same exemplary embodiment, a third transmitter 3000 is introduced into the system and placed on the z-axis. The third signal or magnetic field 3006 generated by the third transmitter 3000 located on the z-axis has an amplitude with a phase difference of 90 degrees with respect to the first and second signals. Additionally, the magnitude of the signals or magnetic fields 3006 generated by the transmitters 3000 placed on the z-axis vary at a frequency f2. In other words, when the magnitude of the second and third signals or magnetic fields 3006 generated by the transmitters 3000 placed on the x- and y-axes are at a maximum, the magnitude of the third signal or magnetic field 3006 generated by the transmitters 3000 on the z-axis is at a minimum or at 0. Consequently, as the magnitude of the first and second signals or the magnetic field 3006 generated by the transmitters 3000 placed on the x- and y-axes reaches a minimum or 0, the magnitude of the third signal or magnetic field generated by the transmitters 3000 placed on the z-axis reaches a maximum.

The waveforms including said third transmitter's 3000 magnetic field 3006 are mathematically described by the formulas below:

$$H_X = A_X \sin(2\pi f1 t) \sin(2\pi f2 t)$$

$$H_Y = A_Y \sin(2\pi f1 t - \pi/2) \sin(2\pi f2 t)$$

$$H_Z = A_Z \sin(2\pi f1 t + \varphi) \sin(2\pi f2 t - \pi/2)$$

In some embodiments, the phase difference of the third signal generated by the transmitters 3000 placed on the z-axis is independent of the phase of the first and second signals generated by the first and second transmitters 3000 placed on the x- and y-axes. In some embodiments, the frequency f2 is smaller than the main carrier frequency (f1) of the wireless power system. In some embodiments, the frequency at which the amplitude varies (f2) is less than the first frequency (f1), the second frequency (f1), and the third frequency (f1). In some embodiments, the frequency f2 is 2 times smaller than the main carrier frequency f1 of the wireless power system. In some embodiments, the frequency f2 is 5 times smaller than the main carrier frequency f1 of the wireless power system. In some embodiments, the frequency f2 is 10 times smaller than the main carrier frequency f1 of the wireless power system. In some embodiments, the frequency f2 is 20 times smaller than the main carrier frequency f1 of the wireless power system. In some embodiments, the frequency f2 is 50 times smaller than the main carrier frequency f1 of the wireless power system. In some embodiments, the frequency f2 is 100 times smaller than the main carrier frequency f1 of the wireless power system. In some embodiments, the frequency f2 is 1,000 times smaller than the main carrier frequency f1 of the wireless power system. In some embodiments, the frequency f2 is 10,000 times smaller than the main carrier frequency f1 of the wireless power system. In some embodiments, the frequency f2 is 1,000,000 times smaller than the main carrier frequency f1 of the wireless power system. In some embodiments, the frequency f2 is 10,000,000 times smaller than the main carrier frequency f1 of the wireless power system.

In some embodiments, the transmitter 3000 placed on the x-axis is designated as the master and the transmitters 3000 placed on the y- and z-axes are slaves. In some embodiments, only one transmitter 3000 is placed on each one of the x- and y-axes. In some embodiments, more than one transmitter 2000 is placed on each one of the x- and y-axes.

In some embodiments, the first and second transmitters 3000 transmit a first and second signal that has a phase difference that is not 90 degrees with respect to each other. In some embodiments, the third transmitter 3000 generates a signal that has an amplitude with a phase difference that is not 90 degrees with respect to the first and second signals generated by the first and second transmitters 3000. In some embodiments, the amplitude of the magnetic field 3006 waveforms is modulated. In some embodiments, the amplitude of the magnetic field 3006 is proportional to the amplitude of the electric current induced in the receiver. In some embodiments, increasing the amplitude of the magnetic field 3006 increases the amount of power transferred wirelessly to a receiver.

In some embodiments, a receiver placed anywhere inside the charging space, placed at any orientation receives wireless power at frequency f1 where its magnitude varies over time with frequency f2. The charging space 3002 is the space comprising the magnetic field 3006 generated by the transmitters 3000. The devices 3008 to be charged wirelessly are placed within the charging space 3002. In some embodiments, the charging space 3002 is as large as a room. In some embodiments, the size of the charging space 3002 is 100 m³. In some embodiments, the size of the charging space 3002 is 10 m³. In some embodiments, the size of the charging space 3002 is 1 m³. In some embodiments, the size of the charging space 3002 is 0.1 m³. In some embodiments, the size of the charging space 3002 is 0.01 m³. In some embodiments, the size of the charging space 3002 ranges between 100 m³ and 10 m³. In some embodiments, the size of the charging space 3002 ranges between 10 m³ and 1 m³. In some embodiments, the size of the charging space 3002 ranges between 1 m³ and 0.1 m³. In some embodiments, the size of the charging space 3002 ranges between 0.1 m³ and 0.01 m³. In some embodiments, the size of the charging space 3002 is 0.02 m³. In some embodiments, the size of the charging space 3002 is 0.03 m³. In some embodiments, the size of the charging space 3002 is 0.04 m³. In some embodiments, the size of the charging space 3002 is 0.05 m³. In some embodiments, the size of the charging space 3002 is 0.06 m³. In some embodiments, the size of the charging space 3002 is 0.07 m³. In some embodiments, the size of the charging space 3002 is 0.08 m³. In some embodiments, the size of the charging space 3002 is 0.09 m³. In some embodiments, the size of the charging space 3002 is 0.2 m³. In some embodiments, the size of the charging space 3002 is 0.3 m³. In some embodiments, the size of the charging space 3002 is 0.4 m³. In some embodiments, the size of the charging space 3002 is 0.5 m³. In some embodiments, the size of the charging space 3002 is 0.6 m³. In some embodiments, the size of the charging space 3002 is 0.7 m³. In some embodiments, the size of the charging space 3002 is 0.8 m³. In some embodiments, the size of the charging space 3002 is 0.9 m³. In some embodiments, the size of the charging space 3002 is 1.1 m³. In some embodiments, the size of the charging space 3002 is 1.2 m³. In some embodiments, the size of the charging space 3002 is 1.3 m³. In some embodiments, the size of the charging space 3002 is 1.4 m³. In some embodiments, the size of the charging space 3002 is 1.5 m³. In some embodiments, the size of the charging space 3002 is 1.6 m³. In some embodiments, the size of the charging space 3002 is 1.7 m³. In some embodiments, the size of the charging space 3002 is 1.8 m³. In some embodiments, the size of the charging space 3002 is 1.9 m³. In some embodiments, the size of the charging space 3002 is 2 m³. In some embodiments, the size of the charging space 3002 is 3 m³. In some embodiments, the size of the charging space 3002 is 4 m³. In some embodiments, the size of the charging space 3002 is 5 m³. In some embodiments, the size of the charging space 3002 is 6 m³. In some embodiments, the size of the charging space 3002 is 7 m³. In some embodiments, the size of the charging space 3002 is 8 m³. In some embodiments, the size of the charging space 3002 is 9 m³. In some embodiments, the size of the charging space 3002 is 11 m³. In some embodiments, the size of the charging space 3002 is 12 m³. In some embodiments, the size of the charging space 3002 is 13 m³. In some embodiments, the size of the charging space 3002 is 14 m³. In some embodiments, the size of the charging space 3002 is 15 m³. In some embodiments, the size of the charging space 3002 is 16 m³. In some embodiments, the size of the charging space 3002 is 17 m³. In some embodiments, the size of the charging space 3002 is 18 m³. In some embodiments, the size of the charging space 3002 is 19 m³. In some embodiments, the size of the charging space 3002 is 20 m³. In some embodiments, the size of the charging space 3002 is 25 m³. In some embodiments, the size of the charging space 3002 is 30 m³. In some embodiments, the size of the charging space 3002 is 40 m³. In some embodiments, the size of the charging space 3002 is 50 m³. In some embodiments, the size of the charging space 3002 is 60 m³. In some embodiments, the size of the charging space 3002 is 70 m³. In some embodiments, the size of the charging space 3002 is 80 m³. In some embodiments, the size of the charging space 3002 is 90 m³.

The device 3008 to be charged wirelessly and position-independently is placed within the charging space 3002 to receive the wireless and orientation-independent power transfer. In some embodiments, the device 3008 is charged wirelessly by magnetic inductive coupling. In some embodiments, the device 3008 is an implantable medical device. Non-limiting examples of implantable medical devices are a pacemaker, an implantable cardiac defibrillator, a cardiac resynchronization device, a drug delivery system, a bone growth generator, a cochlear implant, a neurostimulator, an implantable blood pressure sensor, a retinal prosthesis, a left ventricular assist device (LVAD), or an implantable heart monitor. In some embodiments, the device 3008 is an IoT device or a smart device. Non-limiting examples of IoT or smart devices are smart phones, smart watches, smart key chains, smart bands, smart wearables, smart speaker, smart glasses, home automation systems, smart wall switches and plugs, smart LED light bulbs, motion sensors, smart lighting devices, smart home security systems comprising high definition (HD) video cameras and sensors, smart alarm clocks, or battery powered sensors. In some embodiments, the device 3008 is a smart computing device. In accordance with the description herein, suitable smart computing devices further include, by way of non-limiting examples, notebook computers, tablet computers, netbook computers, smart book computers, subnotebook computers, ultra-mobile PCs, handheld computers, personal digital assistants, Internet appliances, music players, and portable video game systems. Many are suitable for use in the methods described herein. Suitable tablet computers include those with booklet, slate, and convertible configurations. Suitable portable video game systems include, by way of non-limiting examples, Nintendo DS™ and Sony® PSP™.

Figure 4:
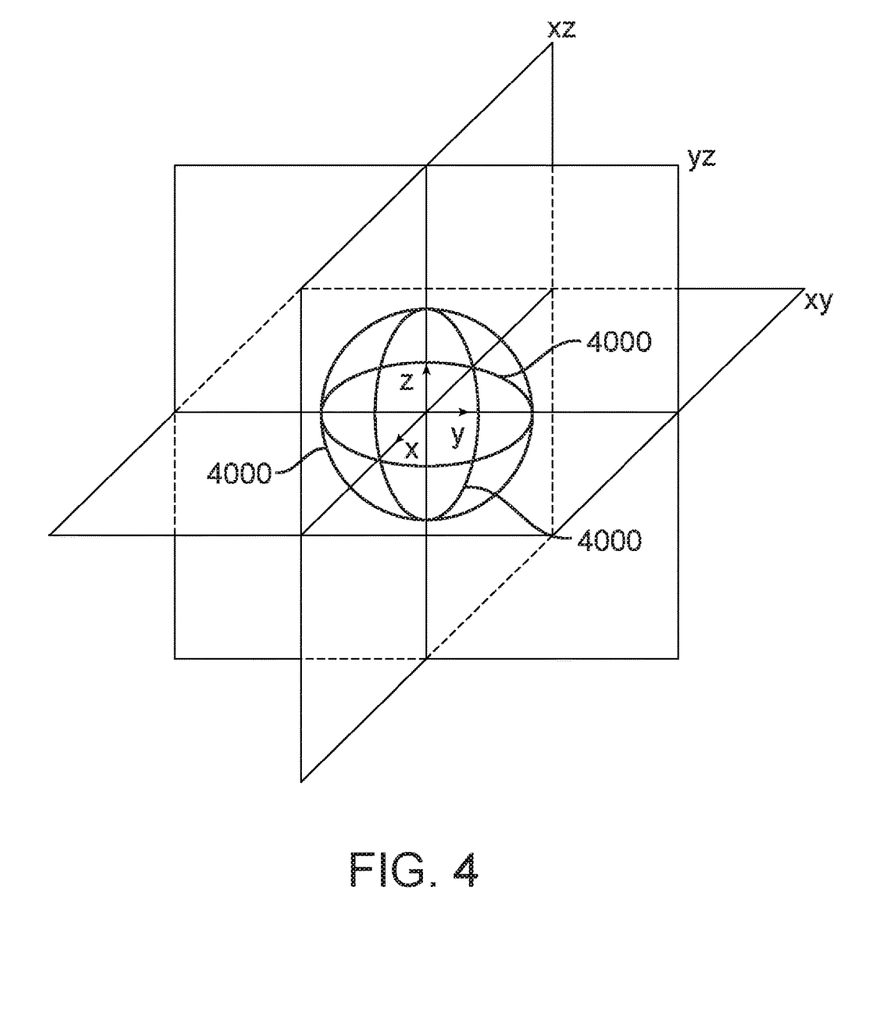
FIG. 4 shows an illustration of an exemplary embodiment of short distance charging wherein three transmitters 4000 are placed within three axes of charging space.

FIG. 4 shows an illustration of an exemplary embodiment of short distance charging wherein three transmitters 4000 are placed within three axes of charging space. In this embodiment, the transmitters 4000 are placed perpendicular to each other. In this embodiment, the transmitters 4000 create a small sized charging space. As the distance between transmitters 4000 is decreased, the size of the charging space decreases. The distance between transmitters 4000 is linearly related to the size of the charging space. In some embodiments, the placement of transmitters 4000 dictates the shape in which the magnetic field rotates in. In some embodiments, the magnetic field rotates in the shape of a sphere when the transmitters 4000 are placed equidistant from each other, as shown in FIG. 4.

Figure 5:
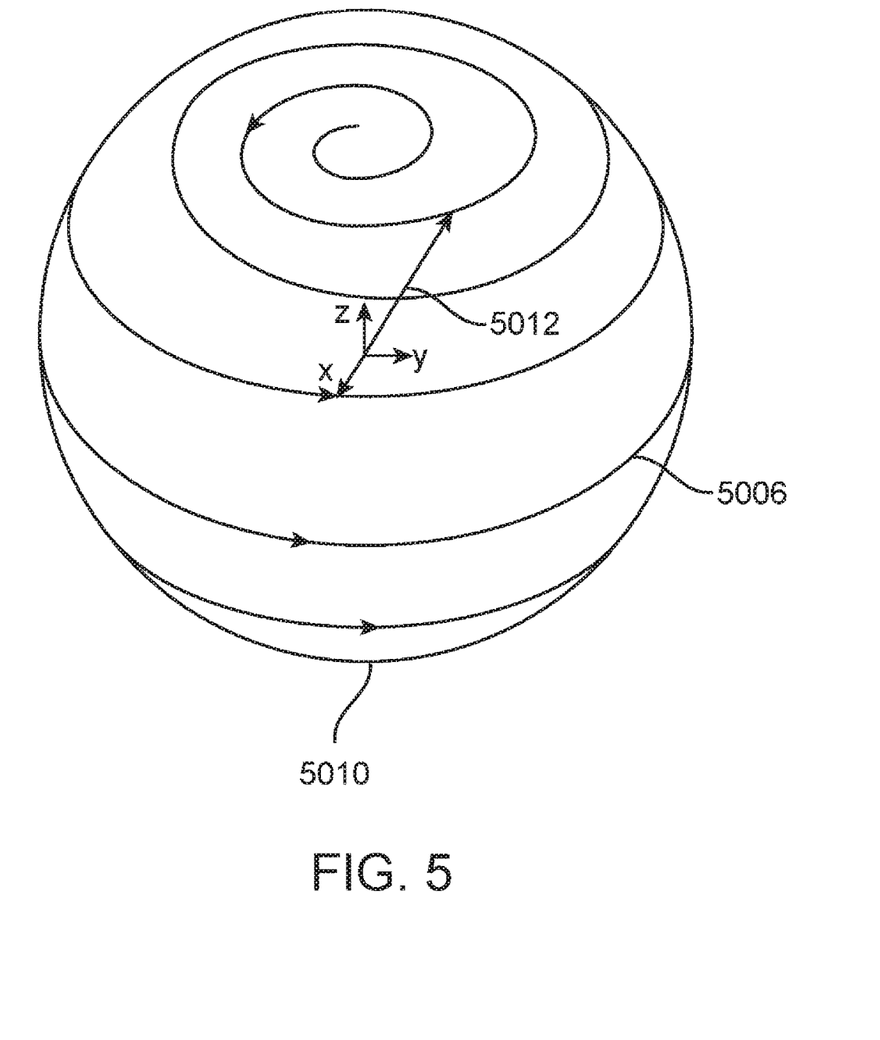
FIG. 5 shows an illustration of a rotating magnetic field 5006 and a magnetic field vector sum 5012 at one moment in time and space.

FIG. 5 shows an illustration of a rotating magnetic field 5006 and a theoretical magnetic field vector sum 5012 at a specific moment in time and physical space. In some embodiments, each transmitter generates a magnetic field 5006. A magnetic field 5006 is represented as a system of vectors at each point of a physical space. The magnetic field vector sum 5012 is the sum of all individual magnetic field vectors, generated by each transmitter, at any point of a physical space. In some embodiments, the phase, frequency, and/or amplitude of the various magnetic fields 5006 generated by the transmitters are modulated to produce a magnetic field vector sum 5012 that rotates in the shape of a sphere 5010, as shown in FIG. 5. In this embodiment, the origin of the magnetic field vector sum 5012 is theoretically placed at the center of the magnetic field 5006.

Figure 6:
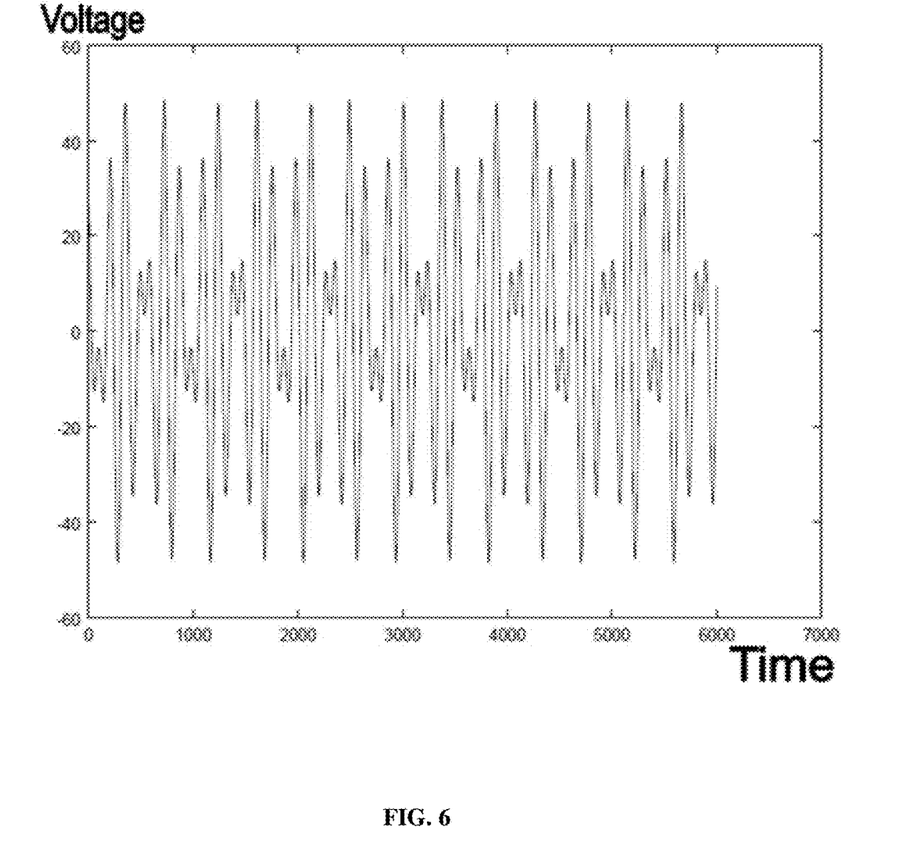
FIG. 6 shows an illustration of a simulation comprising the induced voltage waveforms for a case when three magnetic fields are produced. For this simulation, the magnetic fields were assumed to have a strength that is independent of transmitter position within the charging space, and a receiver was placed on a plane perpendicular to a vector at position (3, 4, 5).
Figure 7:
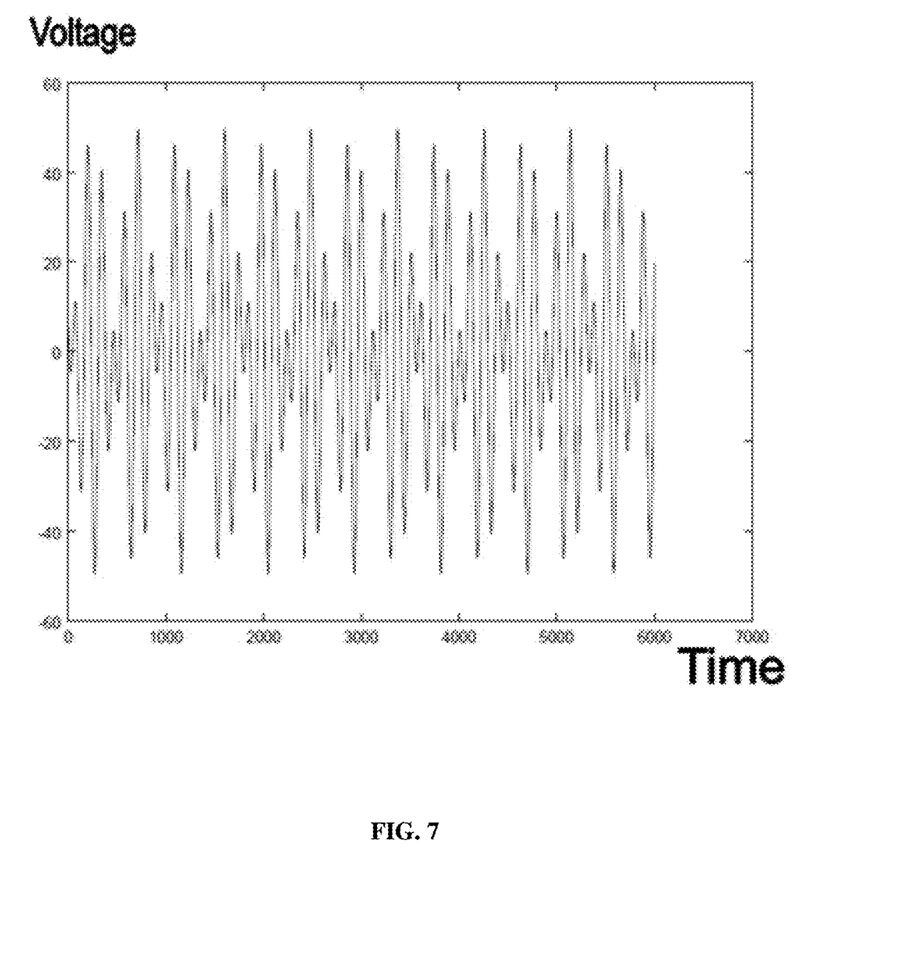
FIG. 7 shows an illustration of a simulation comprising the induced voltage waveforms, wherein the three magnetic fields are produced assuming a magnetic field strength that is independent of transmitter position within the charging space, and a receiver was placed on a plane perpendicular to a vector at position (6, 4, 3).

FIG. 6 shows an illustration of a simulation comprising the induced voltage waveforms of an embodiment wherein three magnetic fields are generated by transmitters. For this simulation, the magnetic fields were assumed to have a strength that is independent of transmitter position within the charging space, and placing a receiver on a plane perpendicular to a vector at an arbitrary position, (3, 4, 5), for example. FIG. 7 shows an illustration of a simulation comprising the induced voltage waveforms of an embodiment wherein the three magnetic fields are produced assuming a magnetic field strength that is independent of transmitter position within the charging space, and placing a receiver on a plane perpendicular to a different vector compared to the vector from FIG. 6's simulation, at an arbitrary position, (6, 4, 3), for example.

FIGS. 6 and 7 illustrate waveforms induced into a receiver coil that is placed at different orientations within a charging space. The charging space, in some embodiments, houses magnetic fields that have strengths which are independent of the positions of the transmitters or receivers. In the simulations of FIGS. 6 and 7, the f1 frequency is set to 6.78 MHz, and the f2 frequency is set to ⅙ of the f1 frequency or 1.13 MHz. The vertical axis represents voltage and the horizontal axis represents time in nanosecond increments. The waveforms show a repetition of the pattern at a frequency f2 set to 1.13 MHz. The waveforms show an oscillation at a frequency f1 set to 6.78 MHz, as expected. The average voltage values of both FIGS. 6 and 7 are the same; thus, these simulations demonstrate that the power transferred wirelessly from the transmitters to the receivers remains the same despite changing the positions of the receivers.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method for orientation-independent, wireless charging of a device comprising:
    a. generating a rotating magnetic field, within a three-dimensional charging space, by using a first transmitter configured to transmit a first signal having a first frequency and a first amplitude, a second transmitter configured to transmit a second signal having a second frequency and a second amplitude, and a third transmitter configured to transmit a third signal having a third frequency and a third amplitude; and
    wherein the first frequency, the second frequency, and the third frequency are equal, and wherein the first amplitude, the second amplitude, and the third amplitude vary at the same frequency; and
    wherein the first frequency has a phase difference of 90 degrees with respect to the second frequency and the third frequency; and
    wherein the third amplitude has a phase difference of 90 degrees with respect to the first amplitude and the second amplitude; and
    b. inducing, by the rotating magnetic field, an electric current in at least one receiver within the three-dimensional charging space;
    wherein the electric current that is induced in the receiver provides power wirelessly to the device, independent of an orientation of the device, relative to the rotating magnetic field.

2. The method of claim 1, wherein the transmitters comprise a transmit antenna or a transmit coil, an oscillator, a driver, and a transmitter impedance match circuit.

3. The method of claim 2, wherein the oscillator transforms a direct current into an alternating current (AC) and generates a signal comprising an amplitude and a frequency.

4. The method of claim 2, wherein the driver amplifies an alternating current and transfers it to the transmitter impedance match circuit.

5. The method of claim 2, wherein the transmitter impedance match circuit matches an impedance of an electric current amplified by the driver to an impedance of the transmit antenna or the transmit coil.

6. The method of claim 1, wherein the transmitters are always on.

7. The method of claim 1, wherein the receiver comprises a receive antenna or receive coil, a receiver impedance match circuit, and a voltage regulator.

8. The method of claim 7, wherein the receiver impedance match circuit cancels out a reactive impedance of a signal generated by the receive antenna or receive coil.

9. The method of claim 7, wherein the voltage regulator regulates an electric current induced in the receiver and provides said regulated electric current to the device.

10. The method of claim 1, wherein the device comprises the receiver.

11. The method of claim 1, wherein the three-dimensional charging space ranges between 0.01 m$^3$ and 100 m$^3$.

12. The method of claim 1, wherein the transmitters are installed on all three axes of space of the three-dimensional charging space.

13. The method of claim 12, wherein the frequency of the transmitters placed on a same axis of space is kept at a phase difference of 0 degrees.

14. The method of claim 1, wherein the frequency at which the amplitude varies is less than the first frequency, the second frequency, and the third frequency.

15. The method of claim 1, wherein a cycle of the rotating magnetic field is independent of the first frequency, the second frequency, or the third frequency.

16. The method of claim 1, wherein the amount of the electric current transferred is independent of an orientation of the transmitters.

17. The method of claim 1, wherein the amount of the electric current transferred is independent of an orientation of the receivers.

18. The method of claim 1, wherein the phase differences in amplitude and frequency depend on a physical position of the transmitters in the charging space.

19. The method of claim 1, wherein the rotating magnetic field induces an electric current in the receive antenna or receive coil.

20. The method of claim 1, wherein the transmitters are energized by a synchronized electric power source.

* * * * *